US008890083B2

(12) United States Patent
Paone et al.

(10) Patent No.: US 8,890,083 B2
(45) Date of Patent: Nov. 18, 2014

(54) SOFT ERROR DETECTION

(75) Inventors: Phil C. Paone, Rochester, MN (US); David P. Paulsen, Dodge Center, MN (US); John E. Sheets, II, Zumbrota, MN (US); Gregory J. Uhlmann, Rochester, MN (US); Kelly L. Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 352 days.

(21) Appl. No.: 13/478,821

(22) Filed: May 23, 2012

(65) Prior Publication Data

US 2013/0313441 A1  Nov. 28, 2013

(51) Int. Cl.
G01J 1/42 (2006.01)
G01T 1/24 (2006.01)

(52) U.S. Cl.
CPC ..................... *G01T 1/247* (2013.01)
USPC ........................................... 250/394

(58) Field of Classification Search
CPC .................. G01T 1/247; G01T 7/00
USPC ............................................. 250/394
See application file for complete search history.

(56) References Cited

U.S. PATENT DOCUMENTS

| 4,090,141 | A | * | 5/1978 | Leblanc | 327/3 |
| 5,117,113 | A | | 5/1992 | Thomson et al. | |
| 5,491,339 | A | | 2/1996 | Mitsui et al. | |
| 6,645,789 | B2 | | 11/2003 | Bernstein et al. | |
| 6,954,916 | B2 | | 10/2005 | Bernstein et al. | |
| 7,092,281 | B1 | | 8/2006 | Aipperspach et al. | |
| 7,224,633 | B1 | | 5/2007 | Hovis et al. | |
| 7,365,313 | B2 | * | 4/2008 | Fuhrer et al. | 250/287 |
| 7,375,339 | B2 | | 5/2008 | Abadeer et al. | |
| 7,459,688 | B2 | * | 12/2008 | Aoki | 250/363.03 |
| 7,791,031 | B2 | | 9/2010 | Keyser et al. | |
| 7,875,854 | B2 | | 1/2011 | Cannon et al. | |

(Continued)

FOREIGN PATENT DOCUMENTS

JP  2008282516 A  11/2008

OTHER PUBLICATIONS

Azizi et al., "A Family of Cells to Reduce the Soft-Error-Rate in Ternary-CAM", Design Automation Conference, 2006 43rd ACM/IEEE, Jul. 24-28, 2006, San Francisco, CA, © 2006 ACM, pp. 779-784.

(Continued)

*Primary Examiner* — Kiho Kim
(74) *Attorney, Agent, or Firm* — Chad J. Hammerlind; Robert R. Williams

(57) ABSTRACT

An apparatus includes a first radiation detector to generate a first signal when a first radiation level is exceeded and a second radiation detector to generate a second signal when a second radiation level is exceeded. The second radiation level is greater than the first radiation level. A first circuit is susceptible to soft errors at the first radiation level and a second circuit is susceptible to soft errors at the second radiation level. A control unit may suspend use of the first circuit and activate use of the second circuit if the first signal is received and the second signal is not received. The first and second circuits may be memory cells or logic circuits.

18 Claims, 10 Drawing Sheets

(56) References Cited

U.S. PATENT DOCUMENTS

2005/0036371 A1* 2/2005 Kushida .................. 365/201
2008/0094896 A1 4/2008 Erickson et al.
2010/0148837 A1 6/2010 McAdams
2010/0271057 A1 10/2010 Cannon et al.
2011/0275356 A1 11/2011 Best et al.
2013/0058453 A1* 3/2013 Kuwabara et al. .............. 378/62

OTHER PUBLICATIONS

Li, "Tolerating Radiation-Induced Transient Faults in Modern Processors", 2005, University of California, Urvine, pp. xix-31.

Mukherjee, "Architecture Design for Soft Errors", Mar. 7, 2008, pp. 1-7,20-54, vol. 1, Morgan Kaufman Publishers, Burlington, MA.

* cited by examiner

US 8,890,083 B2

SOFT ERROR DETECTION

FIELD

This disclosure relates to integrated circuits, and more particularly to detecting soft errors in integrated circuits.

BACKGROUND

Integrated circuits (ICs) have become ubiquitous. Cell phones, computers, automobiles, airplanes, cameras, medical devices, video equipment, and many other devices include ICs. A typical IC includes several types of semiconductor devices, such as transistors. In modern ICs, transistors may be used to implement logic or memory functions. Equipment and devices having ICs are used in a wide variety of environments and operating conditions.

Moore's law refers to a historical trend in which the number of transistors on an IC doubles every 18 months to two years. Moore's law is due in large part to the ability of manufacturers to shrink minimum feature sizes of transistors. For example, a popular processor introduced in 1986 had 29,000 transistors. The size of the smallest features on this IC was $3 \times 10^{-6}$ m. In contrast, the IBM Power7® core introduced in 2010 has 1.2 billion transistors, and uses a $45 \times 10^{-9}$ m process.

SUMMARY

These and other aspects of the invention will be better appreciated and understood when considered in conjunction with the following description and the accompanying drawings. It should be understood, however, that the following descriptions, while indicating some aspects of the invention and some specific details thereof, are given by way of illustration and not of limitation. Many changes and modifications may be made within the scope of the embodiments of the invention without departing from the spirit thereof, and the aspects of the invention include all such modifications.

One embodiment is directed to an apparatus having first and second radiation detectors. The first radiation detector may generate a first signal when a first radiation level is exceeded. The second radiation detector may generate a second signal when a second radiation level is exceeded. The second radiation level may be greater than the first radiation level. In addition, the apparatus may include a first circuit susceptible to soft errors at the first radiation level and a second circuit susceptible to soft errors at the second radiation level. Further, the apparatus may include a control unit coupled with the first and second radiation detectors. The control unit may suspend use of the first circuit and activate use of the second circuit if the first signal is received and the second signal is not received. The first and second circuits may be memory cells or logic circuits. The first radiation detector may include two or more first sensors that are susceptible to soft errors a first radiation level and the second radiation detector may include two or more second sensors that are susceptible to soft errors a first radiation level.

Embodiments directed to methods are also disclosed.

BRIEF DESCRIPTION OF THE DRAWINGS

Embodiments will be better understood from the following detailed description with reference to the drawings, in which.

DETAILED DESCRIPTION

Figure 1:
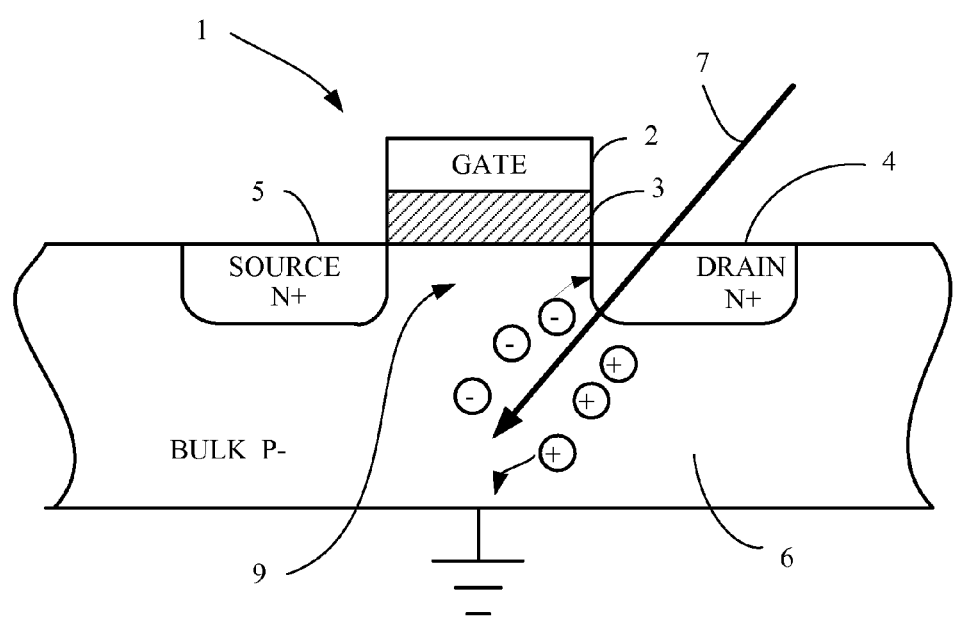
FIG. 1 is a side view of a conventional N-channel field effect transistor illustrating a high energy particle strike.

Features illustrated in the drawings are not necessarily drawn to scale. Descriptions of well-known components and processing techniques are omitted so as to not unnecessarily obscure the disclosed embodiments. The descriptions of embodiments are provided by way of example only, and are not intended to limit the scope of this invention as claimed. The same numbers may be used in the Figures and the Detailed Description to refer to the same devices, parts, components, steps, operations, and the like.

A "soft error" is the changing of an electrical signal so that it represents an incorrect data value through a non-permanent mechanism usually high energy radiation. In a digital circuit, binary logic or bit values corresponding with 1 and 0 are represented by voltage signals. Radiation in the form of a high energy particle striking a semiconductor device may cause a soft error, i.e., a signal that incorrectly represents a bit value. The particles commonly responsible for soft errors are alpha particles and neutrons, although soft errors may be caused by other types of particles. Because high energy particles typically do not cause permanent damage to a semiconductor device, the errors they cause are transient errors and are referred to as "soft." As explained below, the small feature size of transistors, capacitors, and other circuit elements, and the fact that ICs are used in a wide variety of environments may make circuit elements susceptible to soft errors.

FIG. 1 illustrates a mechanism by which a particle may cause a soft error. FIG. 1 is a side view of an N-channel field effect transistor, NFET 1. Gate 2 is typically formed of a polysilicon material, and is often silicided (e.g., with titanium to make titanium silicide) to lower the resistance of the gate. A thin gate oxide 3 separates the gate 2 from an area 9 between a source 5 and a drain 4. The drain 4 is often at a high positive voltage with reference to ground. NFET 1 is formed on a semiconductor substrate, such as substrate 6. In the exemplary drawing of FIG. 1, substrate 6 is a P-doped semiconductor. Substrate 6 is typically coupled to ground.

FIG. 1 illustrates a path 7 taken by a high energy particle passing though NFET 1. The particle may be, for example, an alpha particle or a neutron. The particle passing though the semiconductor 1 generates pairs of electrons and holes creating an ionization track. The positively charged holes are attracted to and swept to the ground. In a similar manner, the negatively charged electrons are attracted to higher voltage regions of the semiconductor 1, such as the drain 4. This flow of positive and negative charges creates a transient current pulse. If the pulse is large enough, it can temporarily disrupt the operation of a transistor.

Transistors are the basic building blocks of the devices that make up a digital circuit. Transistors are used in devices (often referred to as logic gates) that perform various logic operations, such as OR, AND, NOR, NAND, XOR, and INVERT. In addition, transistors and logic gates are the building blocks used to make data-storing circuits, such as, static random access memory (SRAM) cells and registers. Capacitors and transistors are the building blocks used to make dynamic random access memory (DRAM) memory cells. A soft error in a SRAM cell, for example, causes the state of the cell to invert, i.e., causes the bit value stored in the cell to "flip." A soft error in a logic gate can cause a "glitch" that may result in an incorrect output from a combinational logic circuit. For a bit-storage circuit to flip its bit, the energy influx from an incident particle needs to exceed the critical charge or "Qcrit" of the circuit.

The critical charge generally determines the likelihood that a transistor will experience a soft error in a particular operating environment. Critical charge may generally be defined as the minimum amount of induced charge required at a circuit node to cause a voltage pulse to alter the logic state of the circuit. Qcrit is generally proportional to node capacitance (C) and supply voltage (V). As described above, the feature size of transistors has become small in modern ICs. As the dimensions of transistors have been scaled down, the capacitances inherent in the transistors have been reduced. In addition, the voltage needed to drive a transistor has decreased with the down scaling of transistor dimensions. Thus, reducing the size of transistors decreases both the capacitance and supply voltage components of critical charge according to one definition. Accordingly, a particle that strikes the typical small-sized transistor may create a transient current pulse that is large enough to cause a soft error.

An error detection and correction circuit ("ECC") may be used to detect and correct for soft errors in circuits such as memory. A typical ECC may identify up to two flipped bits in a data word and correct for one of the errors. Accordingly, in a low radiation environment the frequency of soft errors may be such that all errors may be corrected by an ECC, but in a different radiation environment the frequency of soft errors may exceed the ability of the ECC to correct all of the errors. Moreover, an ECC may be susceptible to soft errors when operated in the presence of radiation.

Figure 2:
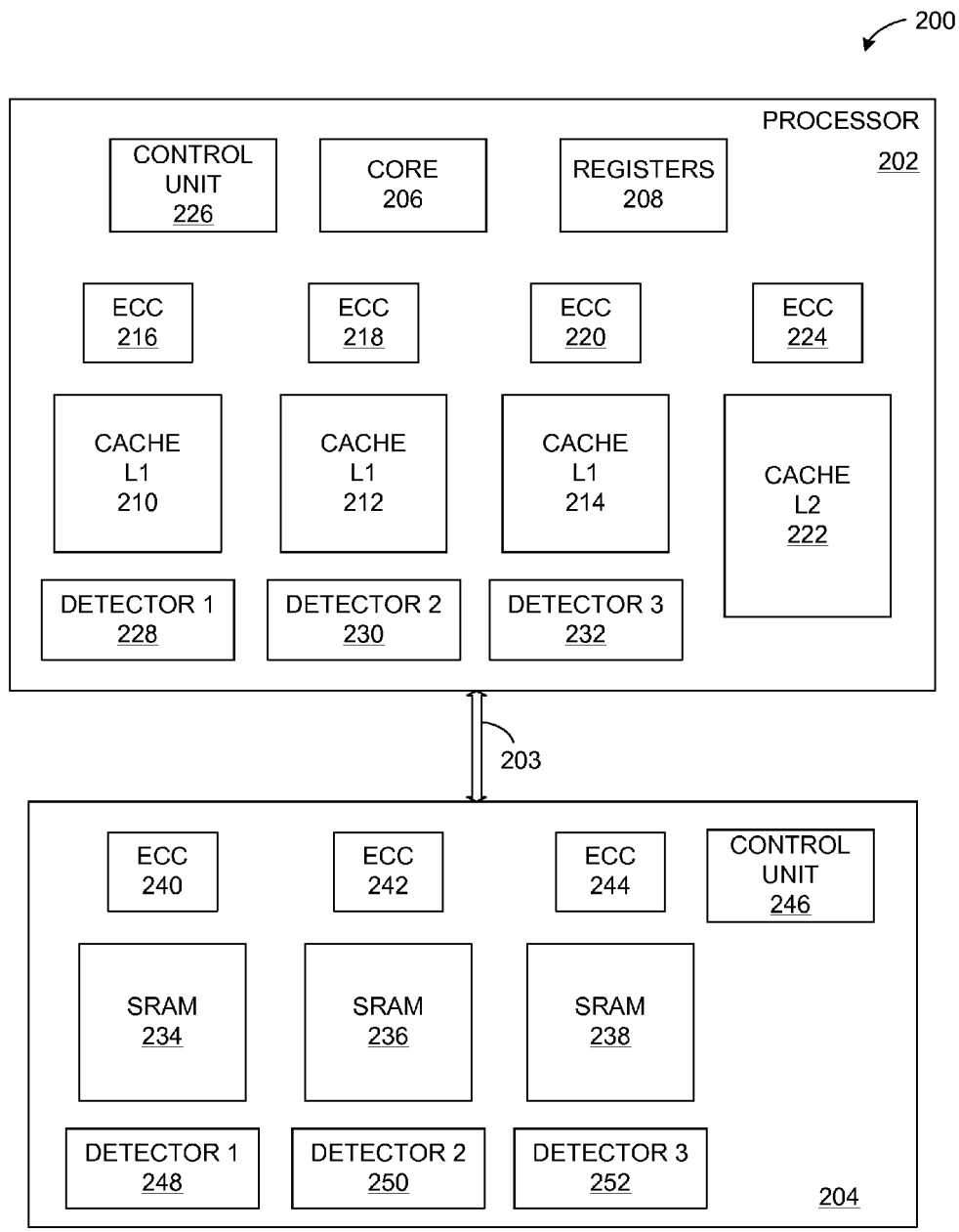
FIG. 2 is a block diagram illustrating an apparatus having first and second ICs, each IC including a control circuit, according to one embodiment.

FIG. 2 is a block diagram illustrating an apparatus 200 having one or more functional units that perform the same function according to one embodiment. The apparatus may include a capability to determine the trustworthiness of duplicate functional units, to suspend a functional unit determined not to be trustworthy, and to activate another functional unit determined to be trustworthy. A duplicate functional unit may be any of a variety of different types of circuits. In the embodiment shown in FIG. 2, one example of a functional unit is an L1 cache memory. A second example of a functional unit is a static random access memory ("SRAM").

In FIG. 2, an exemplary first IC 202 is coupled with a second exemplary IC 204 via a bus 203. The first IC 202 may be a processor having a processor core 206 and registers 208. In one embodiment, the first IC 202 may have an L1 cache 210, an L1 cache 212, and an L1 cache 214. The L1 caches 210, 212, and 214 may be capable of performing the same function, i.e., a small, fast memory located close to the core for storing recently accessed code or data. In one embodiment, the L1 cache 210, L1 cache 212, and L1 cache 214 may have different susceptibilities to soft errors. For example, the L1 cache 210 may be susceptible to soft errors at radiation levels in excess of a first threshold, the L1 cache 212 may be susceptible to soft errors at radiation levels in excess of a second threshold, and the L1 cache 214 may be susceptible to soft errors at radiation levels in excess of a third threshold. In one embodiment, the thresholds may be different from one another. For example, the third threshold may be higher than the second threshold, and the second threshold may be higher than the first threshold. The first IC 202 may have an ECC 216 for use when the core 206 reads or writes to the L1 cache 210. Additionally, the first IC 202 may have ECCs 218 and 220 for use when the core 206 accesses the L1 caches 212 and 214, respectively. In addition, the first IC 202 may include a L2 cache 222, and an ECC 224 for use when the core 206 accesses the L2 cache 222.

In one embodiment, the first IC 202 may include a control circuit 226, and radiation detectors 228, 230, and 232. As explained below, each of the radiation detectors 228, 230, and 232 generates a signal when it detects a radiation level in excess of a threshold. For example, the radiation detector 228 may generate a signal when it detects a radiation level in excess of the first threshold, the radiation detector 230 may generate a signal when it detects a radiation level in excess of the second threshold, and the radiation detector 232 may generate a signal when it detects a radiation level in excess of the third threshold. The thresholds at which that the radiation detectors 228, 230, and 232 generate signals may be the same first, second, and third thresholds at which the L1 caches 210, 212, and 214 are susceptible to soft errors.

The control circuit 226 may use the respective signals of the radiation detectors 228, 230, and 232 to determine the trustworthiness of the L1 caches 210, 212, and 214, as further explained below. In one embodiment, the control circuit 226 is able to determine trustworthiness values, at least in part, because the L1 caches 210, 212, and 214 are respectively susceptible to soft errors at radiation levels in excess of the first, second, and third thresholds. Accordingly, the radiation detector 228 may generate a signal in the presence of substantially the same level of radiation (i.e., the first threshold) that L1 cache 210 is susceptible to soft errors. Similarly, the radiation detector 230 may generate a signal in the presence of substantially the same level of radiation (i.e., the second threshold) that L1 cache 212 is susceptible to soft errors. Further, the radiation detector 214 may generate a signal in the presence of substantially the same level of radiation that L1 cache 214 (i.e., the third threshold) is susceptible to soft errors.

The first IC 202 may include additional circuits and modules other than those shown in FIG. 2. In one embodiment, the first IC 202 is a simplified representation of a processor. In another embodiment, the first IC 202 is a simplified representation of a system on a chip ("SoC").

The second IC 204 may be a SRAM memory chip. In an alternative embodiment, the second IC 204 may be a DRAM memory chip. In one embodiment, the second IC 204 may include SRAM 234, SRAM 236, and SRAM 238. The SRAMs 234, 236, and 238 may be capable of performing the same function, i.e., storing data or instructions. In one embodiment, SRAMs 234, 236, and 238 may have different susceptibilities to soft errors. For example, the SRAM 234 may be susceptible to soft errors at radiation levels in excess of a fourth threshold, the SRAM 236 may be susceptible to soft errors at radiation levels in excess of a fifth threshold, and the SRAM 238 may be susceptible to soft errors at radiation levels in excess of a sixth threshold. In one embodiment, the thresholds may be different from one another. For example, the sixth threshold may be higher than the fifth threshold, and the fifth threshold may be higher than the fourth threshold. The second IC 204 may have an ECC 240 for use when reading or writing to the SRAM 234. Additionally, the second IC 204 may have ECCs 242 and 244 for use when reading or writing to the SRAM 236 and SRAM 238, respectively.

In one embodiment, the second IC 204 may include a control circuit 246, and radiation detectors 248, 250, and 252. Each of the radiation detectors 248, 250, and 252 generates a signal when it detects a radiation level in excess of a threshold. The control circuit 246 may use the signals from the radiation detectors 248, 250, and 252 to determine the trustworthiness of each of the SRAMs 234, 236, and 238. The radiation detectors 248, 250, and 252 may respectively generate a signal when radiation levels in excess of the fourth, fifth, and sixth thresholds are detected. The thresholds at which the radiation detectors 248, 250, and 252 generate signals may be the same fourth, fifth, and sixth thresholds at which the SRAMs 234, 236, and 238 are susceptible to soft errors. Accordingly, radiation detector 248 may generate a signal in the presence of substantially the same level of radiation (i.e., the fourth threshold) that SRAM 234 is susceptible to soft errors. Similarly, radiation detector 250 may generate a signal in the presence of substantially the same level of radiation (i.e., the fifth threshold) that SRAM 236 is susceptible to soft errors. Further, radiation detector 252 may generate a signal in the presence of substantially the same level of radiation (i.e., the sixth threshold) that SRAM 238 is susceptible to soft errors.

The radiation detectors 228, 230, and 232 may be formed using the same manufacturing process as that used to form the corresponding circuits, i.e., the L1 caches 210, 212, and 214. Similarly, the radiation detectors 248, 250, and 252 may be formed using the same manufacturing process as that used to form the corresponding circuits, i.e., SRAMs 234, 236, and 238. The use of the same manufacturing process for both detectors and functional units may be an advantage.

The radiation detectors 228, 230, 232, 248, 250, and 252 may be distributed at various physical locations on the ICs 202 and 204. In addition, while a particular radiation detector may be located at any suitable location on an IC, in various alternative embodiments a particular radiation detector may be located at two or more suitable, noncontiguous locations on an IC. For example, the radiation detector 228 may include first and second portions located at different physical locations on the IC 202.

Figure 3:
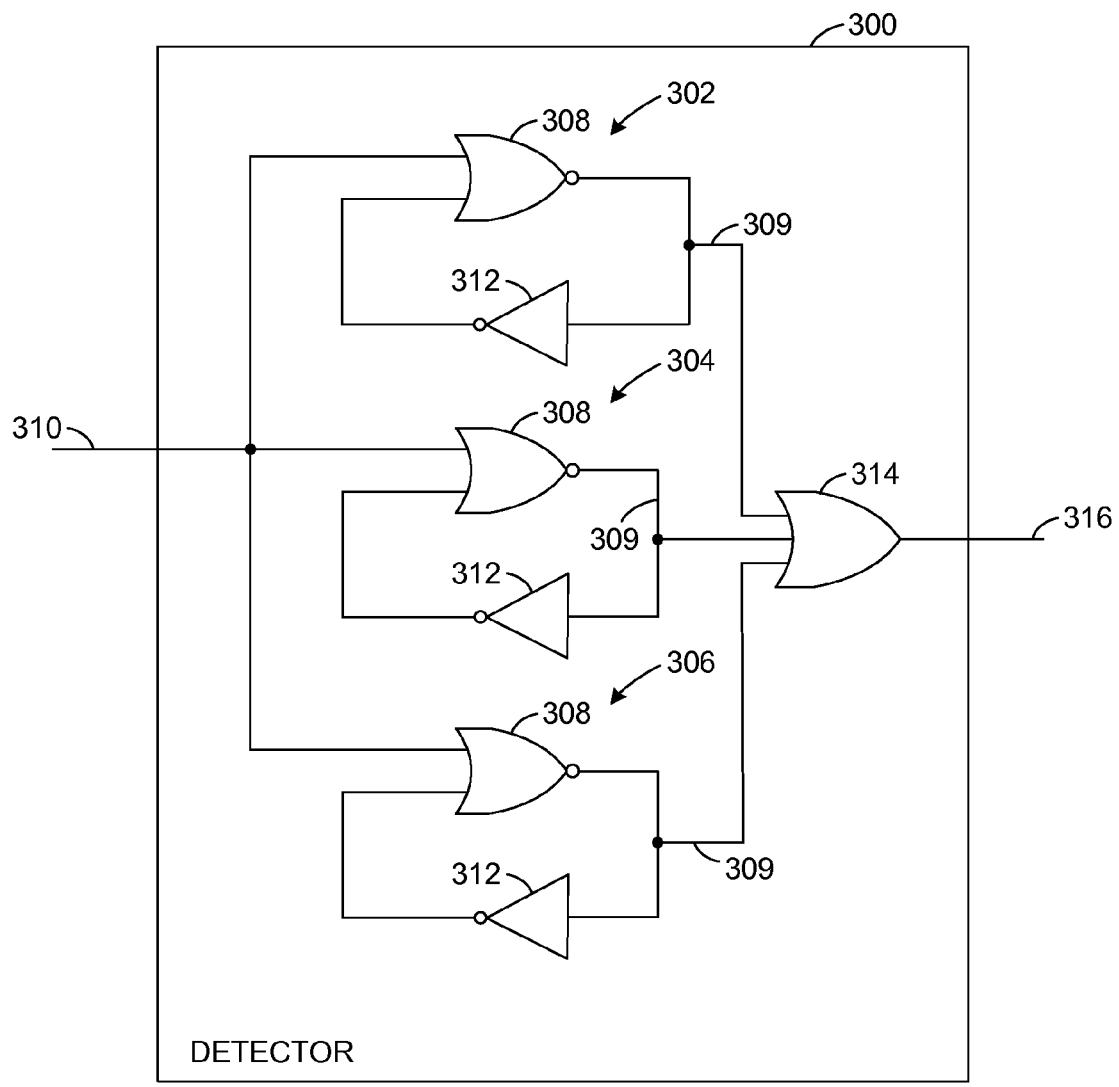
FIG. 3 is a diagram of a radiation detector according to one embodiment.

FIG. 3 is a diagram of a radiation detector 300 according to one embodiment. The radiation detectors 228, 230, 232, 248, 250, and 252 shown in FIG. 2 may be of the same design as the radiation detector 300 in various embodiments. The radiation detector 300 may include a plurality of sensors. The exemplary radiation detector 300 includes sensors 302, 304, and 306. The exemplary radiation detector 300 may generate a signal indicating that a particular threshold of radiation has been exceeded if any of the sensors experiences a state change. The sensors 302, 304, and 306 may be latches, SRAM cells, or other similar mechanisms that are sensitive to soft errors.

Referring to FIG. 3, each of the sensors 302, 304, and 306 are latches. Each latch has a two-input NOR gate 308. One input of the NOR gate 308 is coupled with an input 310 to the detector 300. The output of the NOR gate 308 is coupled with the input of an inverter 312. The outputs of the NOR gates 308 are outputs 309 of the sensors 302, 304, 306. The output of the inverter 312 is coupled with the other input of the NOR gate 308. In addition, the output 309 of each sensor is coupled with one input of a multi-input OR gate 314. The output of the OR gate 314 is coupled with an output 316 of the detector 300.

As further explained below, a logic 1 may be placed on the detector inputs 310 in a soft error detecting mode, causing each of the sensors 302, 304, and 306 to store a 0 on the outputs of the respective sensors. The stored 0 is an initial state of each sensor. The 0s on the outputs are fed back through the respective inverters to hold the 0s on the outputs 309 of each sensor. Accordingly, placing a 1 on the detector input 310 causes all sensor outputs 309 to fall to 0, which in turn results in a 0 signal on the output 316 of the radiation detector 300. In one embodiment, one or more of the transistors used to implement the sensors 302, 304, and 306 may have substantially the same critical charge as a transistor in a circuit or functional unit, such as a L1 cache 210, 212, 214 or SRAM 234, 236, 238, that may be associated with the detector 300. A high energy particle, such as an alpha particle or a neutron, striking any one of the sensors 302, 304, or 306 may cause the sensor to change state, causing an output 309 to change to a logic 1. When one of the sensors 302, 304, or 306 stores a 1 on its output it is in a "signaling state." If any sensor output 309 rises to a 1, the radiation detector 300 will generate a 1 signal on the output 316. In one embodiment, assertion of a 1 signal on the output 316 may indicate that a radiation level in excess of a particular threshold has been detected.

Figure 4:
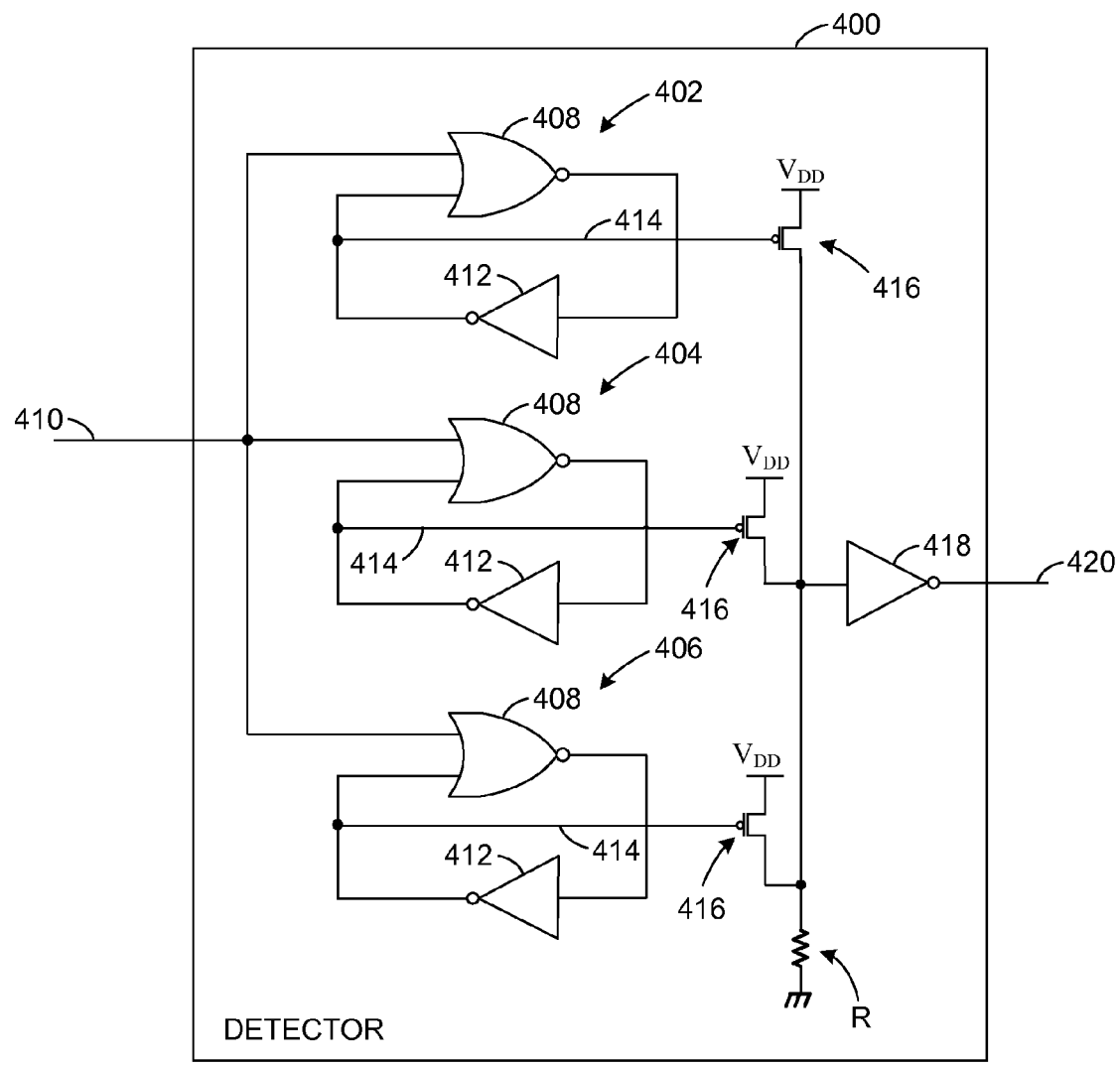
FIG. 4 is a diagram of a radiation detector according to one alternative embodiment.

FIG. 4 is a diagram of a radiation detector 400 according to one alternative embodiment. The radiation detectors 228, 230, 232, 248, 250, and 252 shown may be of the same design as the radiation detector 400 in various embodiments. The radiation detector 400 may include a plurality of sensors. The exemplary radiation detector 400 includes sensors 402, 404, and 406. The exemplary radiation detector 400 may generate a signal indicating that a particular threshold of radiation has been exceeded based on a sensor voting scheme, i.e., whether a predetermined number of sensors experience a state change.

FIG. 4 shows sensors 402, 404, and 406. Each of the sensors 402, 404, and 406 includes a two-input NOR gate 408. One input of the NOR gate 408 is coupled with an input 410 of the detector 400. The output of the NOR gate 408 is coupled with the input of an inverter 412. The output of the inverter 412 is coupled with the other input of the NOR gate 408, and is an output 414 of the sensor. In addition, the output 414 of each sensor is coupled with the gate of a p-channel metal-oxide semiconductor (PMOS) transistor or device 416. The source node of each PMOS device 416 is coupled with an input of an inverter 418 and to ground via a resistor R. The drain of each PMOS device 416 is coupled with a voltage supply V-DD. The output of the inverter 418 is an output 420 of the detector 400. The inverter 418 may have a voltage input low value V-IL and a voltage input high value V-IH. The inverter 418 outputs a logic 1 if the voltage on its input is below V-IL and outputs a logic 0 if the voltage on its input is above V-IH. The inverter 418 may be designed so that the voltage on its input will be greater than V-IH only if a predetermined number of sensors 402, 404, and 406 change their state. In this way, the inverter 418 may function to count the number of sensors having a state change and compare the count with a predetermined number. Use of the radiation detector 400 may be advantageous in a system where an ECC is trusted to correct a small number of soft errors but not trusted to correct a large number of soft errors. For example, if fewer than the predetermined number of sensors change their state, the ECC may be trusted to correct any soft errors in the corresponding function unit. However, if the predetermined (or a larger) number of sensors change their state, the ECC may not be trusted to correct any soft errors in the corresponding function unit.

A logic 1 may be placed on the detector input 410 in a soft error detecting mode, causing the NOR gates 408 of each sensor to output a 0. The 0s on the outputs of the NOR gates 408 are fed back through the respective inverters 412 to place and hold the is on the outputs 414 of each sensor. Accordingly, placing a 1 on the detector input 410 causes all sensor outputs 414 to be a logic 1. The stored 1 is an initial state of each sensor. The is are input to the gates of the PMOS devices 416, placing the devices in an off state. As a result, the voltage on the input to inverter 418 stays below V-IL, which in turn results in a 1 signal on the output 420 of the radiation detector 400. A 1 signal on the output 420 may indicate that a radiation level in excess of a threshold has not been detected.

A high energy particle, such as an alpha particle or a neutron, striking any one of the sensors 402, 404, or 406 may cause the output 414 of a respective sensor to change to a 0. If any sensor output 414 falls to a 0, the associated PMOS transistor 416 will turn on, causing the voltage on the input to inverter 418 to rise. When one of the sensors 402, 404, or 406 stores a 1 on its output it is in a signaling state. In one embodiment, state changes in a predetermined number of sensors cause a voltage rise on the input of inverter 418 that is sufficient to exceed V-IH. If the predetermined number of sensors experience a state change, the voltage on the input to inverter 418 rises above V-IH and the radiation detector will generate a 0 signal on the output 420. In one embodiment, if two sensors experience a state change, the voltage on the input to inverter 418 may rise above V-IH, causing the radiation detector 400 to generate a 0 signal on the output 420. In another embodiment, a state change in a single sensor causes a voltage rise on the inverter input that is above V-IH. Assertion of a 0 signal on the output 420 may indicate that a radiation level in excess of a threshold has been detected.

In one embodiment, one or more of the transistors used to implement the sensors 402, 404, and 406 may have substantially the same critical charge as a transistor in a circuit or functional unit, such as a L1 cache 210, 212, 214, or the SRAM 234, 236, 238, that may be associated with a detector 400.

The PMOS devices 416 of the sensors 402, 404, and 406 may cause substantially the same amount of current to flow when turned on. In one embodiment, a PMOS device 416 associated with one of the sensors 402, 404, and 406 may cause more current to flow when turned on than another PMOS device 416. In this way, the state change of a sensor associated with the large current may be weighted more heavily in the "counting" performed by the inverter 418 than a sensor associated with a smaller current. In this embodiment, the inverter 418 may function to count the number of sensors having a state change, weighting particular sensors more heavily than others in the count, and compare the count with a predetermined value.

Figure 5:
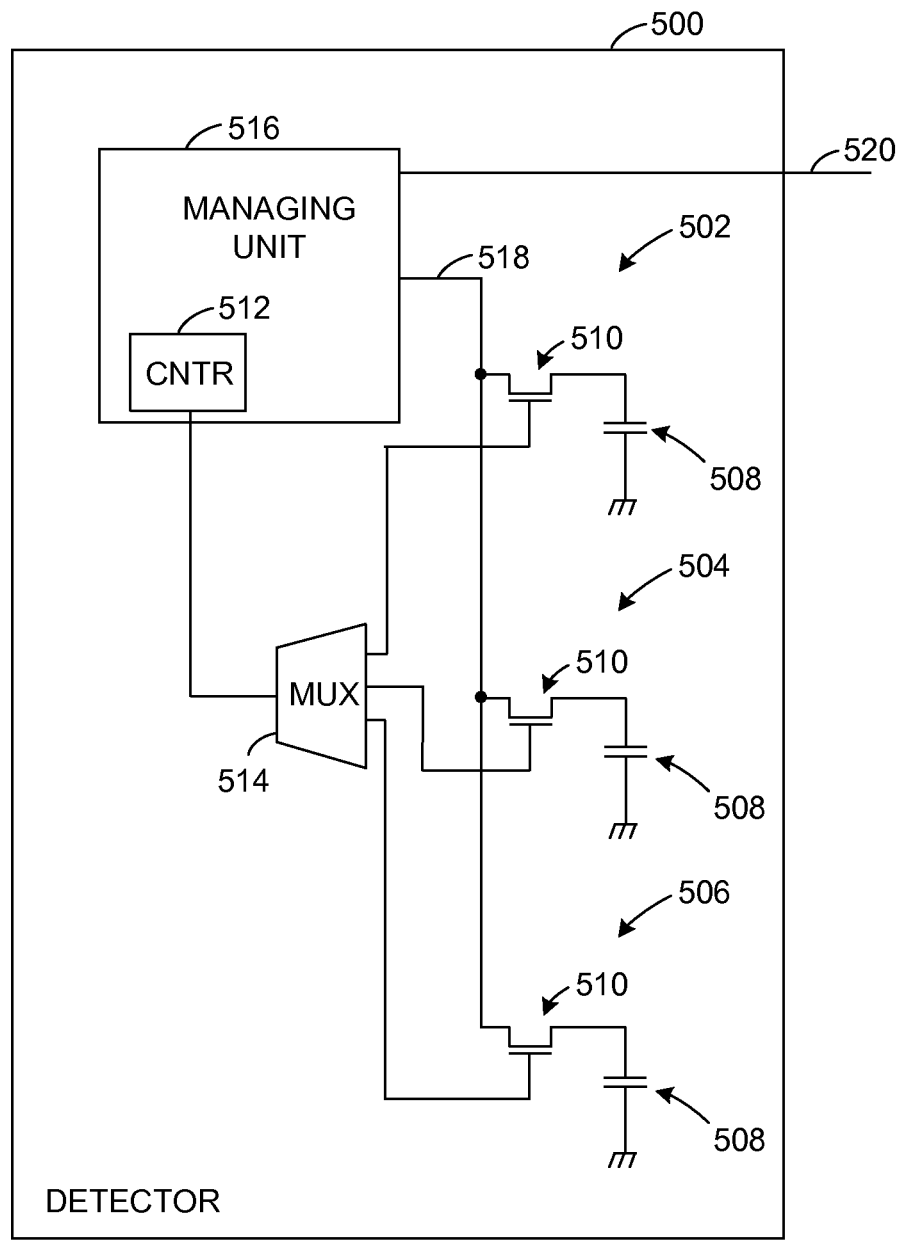
FIG. 5 is a diagram of a radiation detector according to one alternative embodiment.

FIG. 5 is a diagram of a radiation detector 500 according to one alternative embodiment. The radiation detectors 228, 230, 232, 248, 250, and 252, in various embodiments, may be of the same design as radiation detector 500. The radiation detector 500 may include a plurality of sensors. The exemplary radiation detector 500 may include sensors 502, 504, and 506. Each of the sensors 502, 504, and 506 includes a capacitor 508 and n-channel metal-oxide semiconductor (NMOS) transistor 510. The gates of the transistors 510 may be coupled with a counter unit 512 via a multiplexer 514. A managing unit 516 may include the counter unit 512 and may be coupled with a node of each of the NMOS transistors 510 via a line 518, as shown in FIG. 5. The managing unit 516 refreshes each of the capacitors 508 according to a schedule that ensures that the value stored in the capacitor is retained. The managing unit 516 includes circuitry to sense the value stored in a capacitor 508. In addition, the managing unit 516 includes circuitry to store an initial value in the capacitors 508 in a soft error detecting mode.

In one embodiment, the managing unit 516 stores a logic 1 in each of the capacitors 508 in a soft error detecting mode. Alternatively, a logic 0 may be stored. The 1 or the 0 is the initial state of the sensors. In one embodiment, the capacitors used to implement the sensors 502, 504, and 506 may have substantially the same critical charge as an associated circuit or functional unit, such as duplicate DRAMs that may be associated with the detector 500. A high energy particle, such as an alpha particle or a neutron, striking any one of the sensors 502, 504, or 506 may cause the state of a capacitor 508 to change. When one of the sensors 502, 504, or 506 stores the complement of its initial state it is in a signaling state.

The counter 512 may control the multiplexer 514 to sequentially select sensors 502, 504, and 506. When a sensor is selected, the transistor turns on, allowing the managing unit 516 to store a logic 1 in a respective capacitor 508. The 1 may be the initial state of the sensor. The managing unit 516 refreshes the capacitors 508 periodically in accord with a minimum refresh rate parameter. For example, the capacitors 508 may be refreshed every 64 ms. In one embodiment, the refresh process may include sensing the state of the capacitors 508; the managing unit 516 may compare the expected state with the state sensed in a refresh operation. If the sensed state is different from the initially stored state, the managing unit 516 may infer the presence of radiation. If the sensed state of any one capacitor is different from the initially stored state, the managing unit 516 may generate a signal indicating that a radiation level in excess of a threshold has been detected on line 520. In an alternative embodiment, if the sensed state of a predetermined number of capacitors is different from the initially stored states, the managing unit 516 may generate a signal indicating that a radiation level in excess of a threshold has been detected on line 520. In this embodiment, the managing unit 516 may function to count the number of sensors having a state change and compare the count with a predetermined number. In this embodiment, the use of the radiation detector 500 may be advantageous in a system where an ECC is trusted to correct a small number of soft errors but not trusted to correct a large number of soft errors.

In some embodiments, it may be desirable to check the state of the capacitors 508 more often than required by a minimum refresh rate parameter. For example, even though the minimum refresh rate parameter for particular capacitors 508 may be 64 ms, in one embodiment, the managing unit 516 reads and compares each capacitor's stored state with its initial state every 100 μs. The managing unit 516 may sequentially read each of the capacitor's stored stated using the counter 512 and the multiplexer 514. In one embodiment, an SRAM associated with the detector 500 may employ a refresh rate that is different from the rate at which the managing unit 516 reads and compares the stored states of capacitors 508. For example, the SRAM 234, 236, 238 may employ a refresh rate of 64 ms, while the detector 500 evaluates the stored states of capacitors 508 every 100 μs.

When latches or SRAM memory cells are used as radiation sensors in accord with various embodiments of the invention, the critical charge (Qcrit=C*V) of a latch may be varied through design changes. For example, capacitance C may be varied using a variety of techniques, such as altering the size or geometry of a transistor, or modifying gate oxide thickness. Similarly, when a sensor includes discrete capacitors as radiation sensors, the critical charge of a sensor may be varied through design changes, such as altering the size or geometry of a capacitor.

Figure 6:
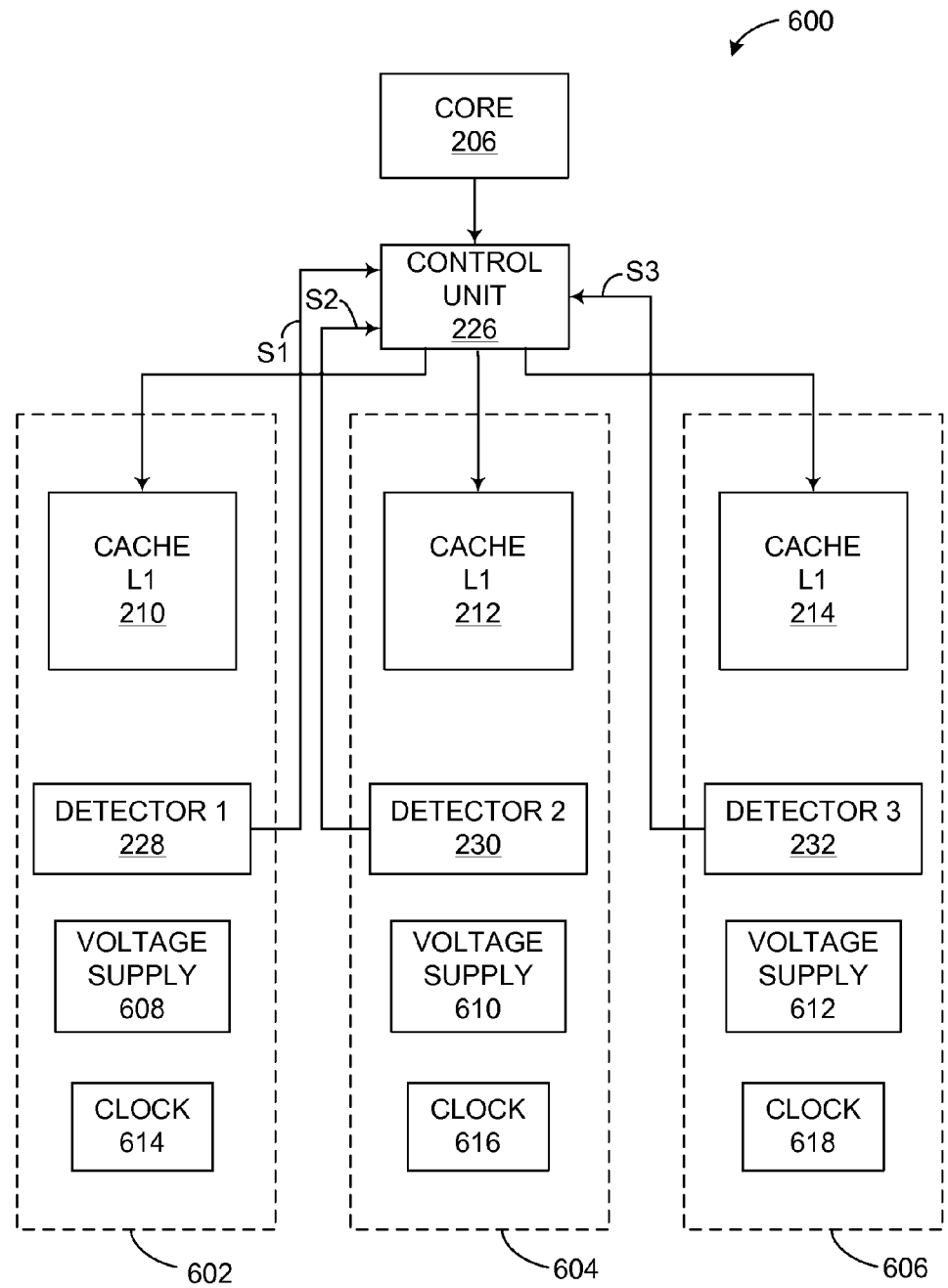
FIG. 6 is an alternative block diagram of the first IC of FIG. 2.

FIG. 6 is an alternative block diagram of the first IC 202 of FIG. 2 showing how particular components may be arranged in domains. Specifically, FIG. 6 shows the control circuit 226, the L1 caches 210, 212, and 214, and the radiation detectors 228, 230, and 232. In one embodiment, a L1 cache and its associated detector are provided in a domain. A domain may be specified in terms of a clock signal, a supply or reference voltage level, or both. In the example of FIG. 6, L1 cache 210 and radiation detector 228 are included in domain 602, L1 cache 212 and radiation detector 230 are included in domain 604, and L1 cache 214 and radiation detector 230 are included in domain 606. In addition, the domains 602, 604, and 606 may respectively include voltage supplies 608, 610, and 612, and clock sources 614, 616, and 618. The voltage supplies 608, 610, and 612 may be distinct. For example, the voltage supply 610 may be higher than the voltage supply 608. Similarly, the clock sources 614, 616, and 618 may be distinct. For example, the clock source 614 may be slower than the clock source 616.

Referring to FIG. 6, the radiation detector 228 may have substantially the same susceptibility to soft errors as L1 cache 210, the radiation detector 230 may have substantially the same susceptibility to soft errors as L1 cache 212, and the radiation detector 232 may have substantially the same susceptibility to soft errors as L1 cache 214. In one embodiment, a radiation detector corresponding with a duplicated functional unit or circuit generates a signal indicating whether a threshold radiation level has been exceeded, which in turn may indicate the trustworthiness of the functional unit. In particular, the radiation detectors 228, 230, and 232 may respectively generate signals S1, S2, and S3 if first, second, and third radiation thresholds have been exceeded. According to various embodiments, if a radiation detector signals that a particular functional unit is not trustworthy, the use of that unit is suspended. A different functional unit that is less susceptible to soft errors than the particular functional unit may be used instead. For example, if radiation detector 228 generates a signal S1, the use of L1 cache 210 is suspended, and the L1 cache 212 may instead be used. Because the L1 cache 212 is in domain 604, use of the L1 cache 212 may include using the voltage supply 610, the clock source 616, or both. Accordingly, suspending use of L1 cache 210 and initiating use of L1 cache 212 may include changing clock frequency or supply voltage. In one embodiment, a process of suspending the use of one functional unit and initiating the use of another functional unit that is less susceptible to soft errors may include rebooting the system. If a radiation detector signals that a particular functional unit is not trustworthy and there is no functional unit less susceptible to soft errors than the particular functional unit, then operation of the system is suspended. Suspension of system operation may include shutting the system down.

In one embodiment, the duplicate circuits or functional units in FIG. 6 are the L1 caches 210, 212, 214. In one alternative embodiment, the duplicate functional units may be the SRAMs 234, 236, and 238, and the control circuit 246 may be used in lieu of control circuit 226. More generally, in various embodiments, the duplicate functional units may be ECCs 216, 218, 220. The duplicate functional units may be two or more instances of L2 cache 222 or ECC 224. Additionally, the duplicate functional units may be two or more instances of the registers 208 or the processor 202. Further, the duplicate functional units may be two or more instances of a DRAM. In various embodiments, the duplicate functional units may be any suitable logic or memory circuit.

Figure 7:
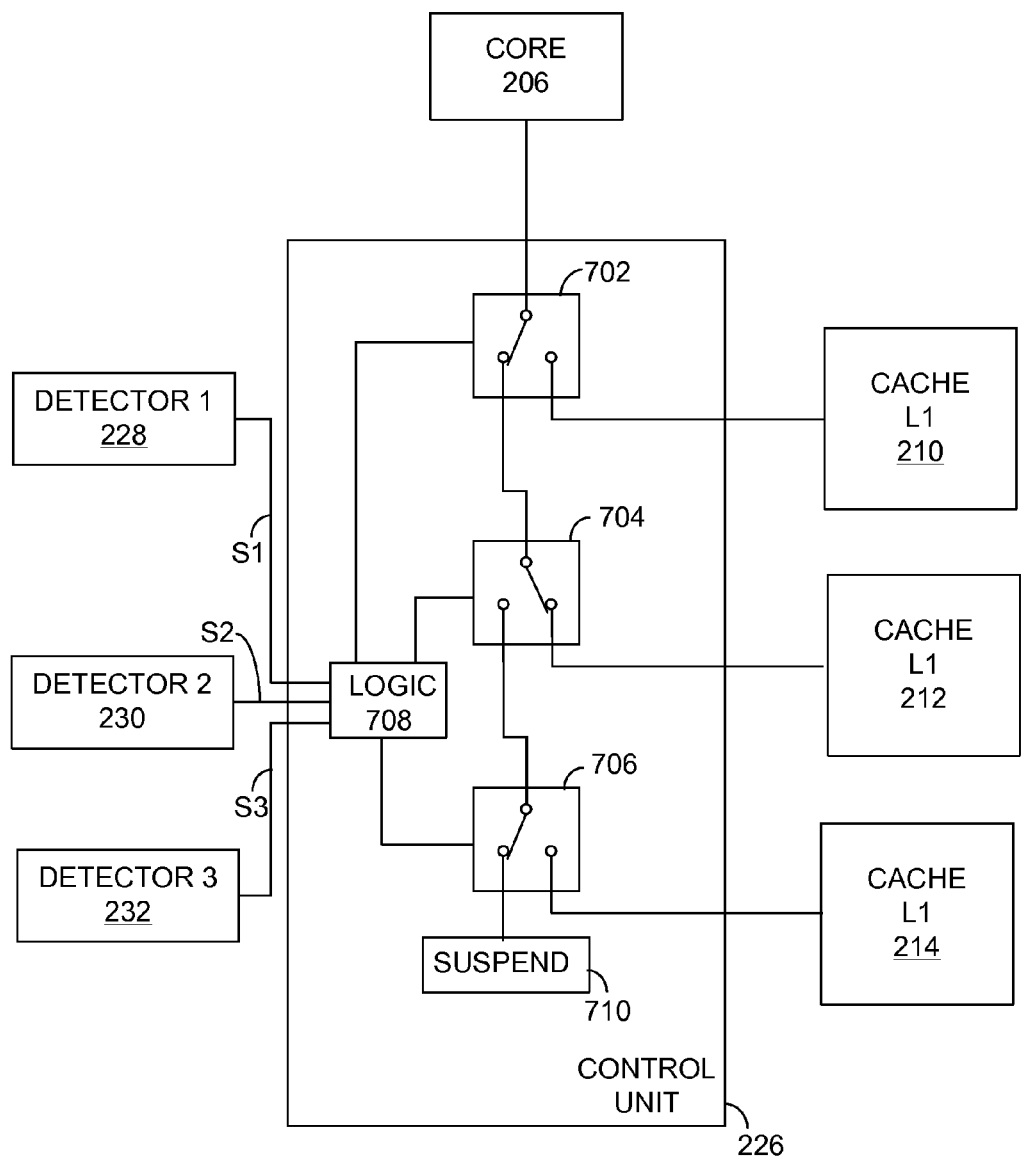
FIG. 7 is block diagram showing functional aspects of a control circuit of FIG. 2 according to one embodiment.

FIG. 7 is block diagram showing functional aspects of the control unit 226 according to one embodiment. The control unit 226 may include switches 702, 704, and 706 that may be controlled by a logic module 708. The switches 702, 704, and 706 may be controlled to couple the core 206 with any one of the L1 caches 210, 212, or 214. The logic module 708 receives input signals S1, S2, and S3 from the radiation detectors 228, 230, and 232. FIG. 7 is one example of the functional aspects of a control unit. In an alternative embodiment, the control unit 246 (FIG. 2) may include the same or similar functional aspects as the control unit 226. In this alternative, the radiation detectors 248, 250, and 252 may be substituted for the radiation detectors 228, 230, and 232. Similarly, the SRAMs 234, 236, and 238 may be substituted for the L1 caches 210, 212, or 214.

In operation, the logic module 708 controls switch 702 so that the core 206 is coupled with the L1 cache 210 if none of the input signals S1, S2, and S3 are asserted. If input signal S1 is asserted, but the signals S2 and S3 are not asserted, the logic module 708 controls switches 702 and 704 so that the core 206 is coupled with the L1 cache 212, as shown. If input signals S1 and S2 are asserted, but the signal S3 are is not asserted, the logic module 708 controls switches 702, 704, and 706 so that the core 206 is coupled with the L1 cache 214. If input signals S1, S2, and S3 are asserted, the logic module 708 controls the switches so that use of the L1 caches is suspended (block 710).

In one embodiment, when the use of a particular one of the L1 caches is suspended and a different one of the L1 caches is to be used, the logic module 708 may cause a change in the clock signal used, the supply or reference voltage level used, or in both the clock signal and supply voltage. For example, the L1 cache 212 may operate at a slower clock speed than the L1 cache 210. When switching to the cache 212 from the cache 210, the logic module 708 may cause a change to the clock speed to accommodate the use of the cache 212. Accordingly, a system according to the principles of the invention may use a small, fast, energy efficient circuit generally, but continue to operate in radiation environments in which the generally used circuit may be susceptible to soft errors with a duplicate circuit that may use a slower clock speed or higher supply voltage than the generally used circuit.

Figure 8A:
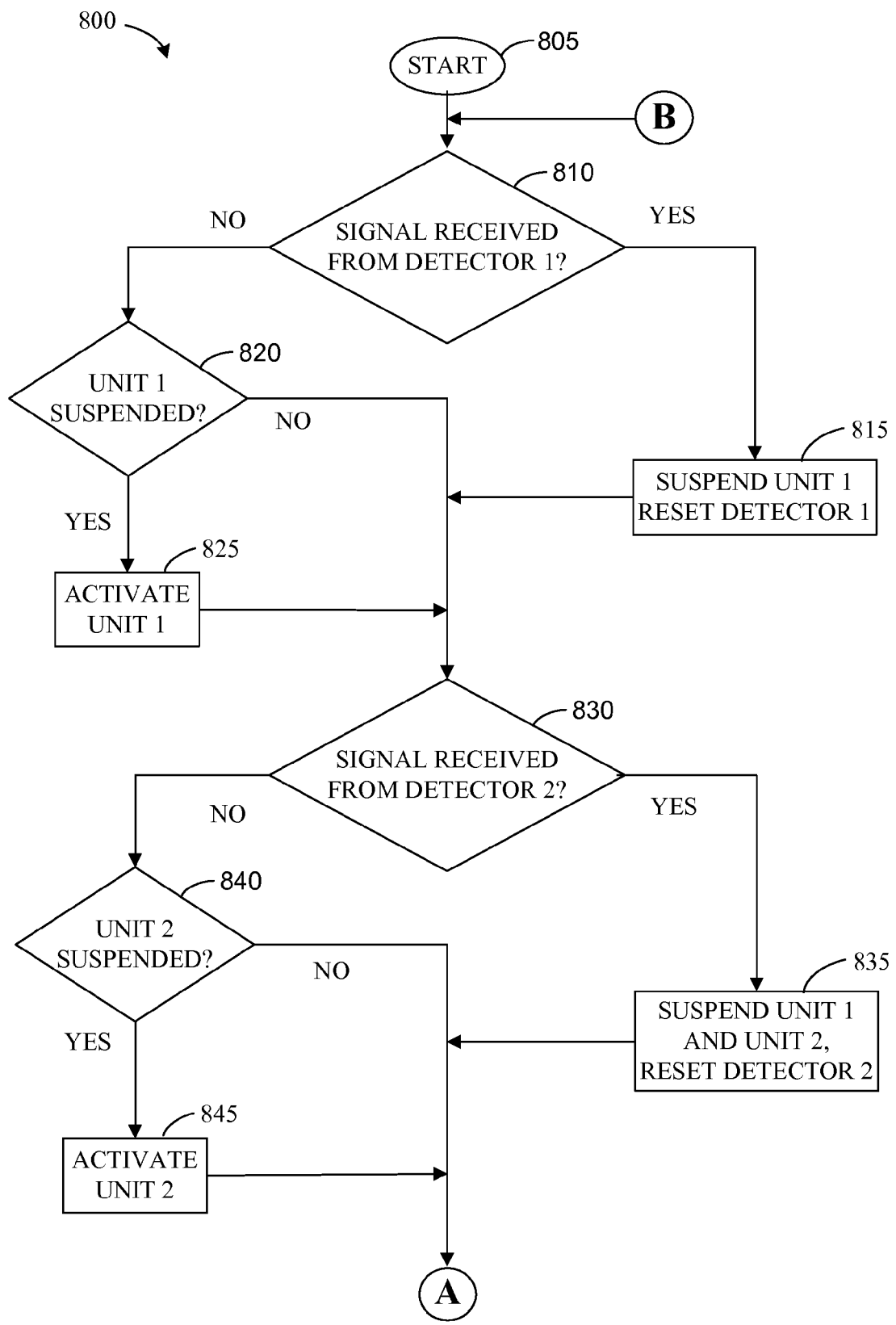
FIGS. 8A and 8B illustrate an exemplary method for determining the reliability of a circuit in the presence of radiation according to one embodiment.
Figure 8B:
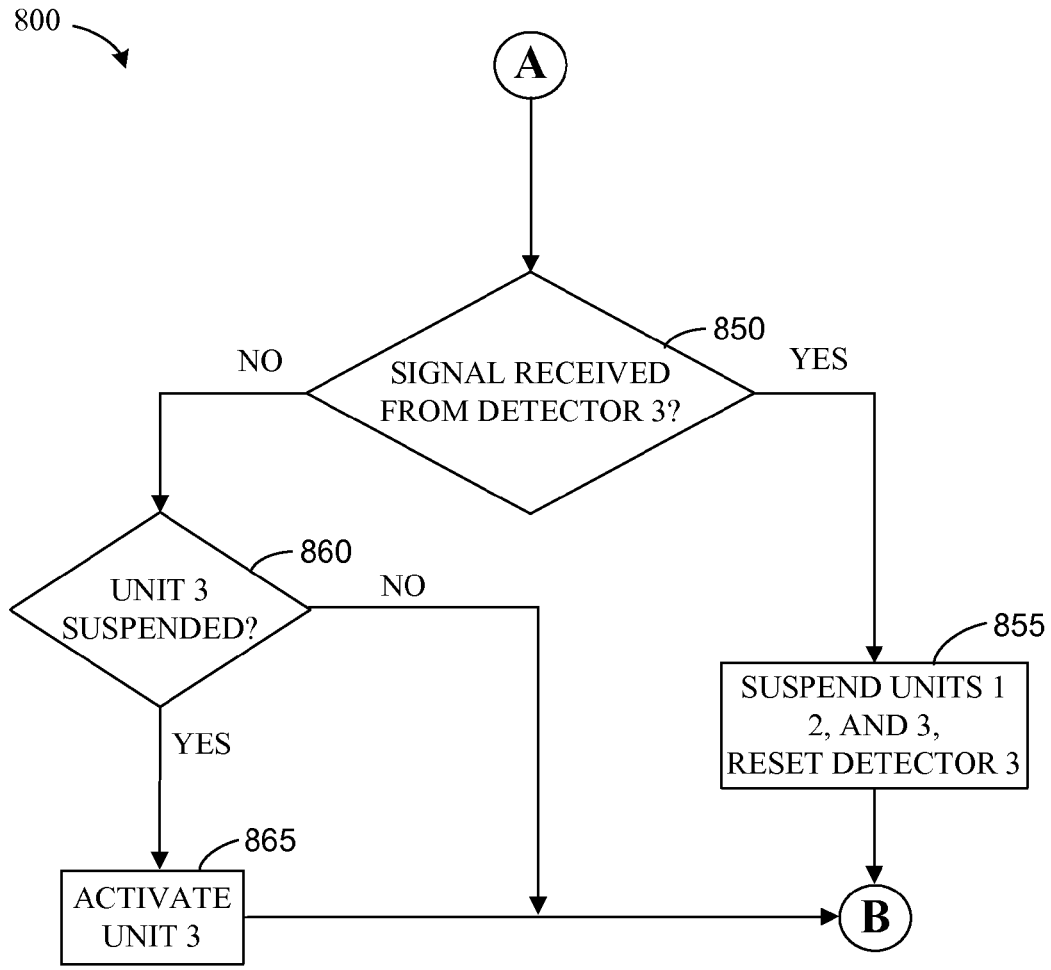

FIGS. 8A and 8B illustrate an exemplary method 800 for determining the reliability of a circuit in the presence of radiation according to one embodiment. The method 800 may be used in a system having three duplicate functional units: first, second, third units. The first, second, third units may be respectively susceptible to soft errors at radiation levels in excess of first, second, and third thresholds. In addition, the system may include first, second, and third radiation detectors. The first, second, and third radiation detectors may respectively generate a signal in the presence radiation levels in excess of the first, second, and third thresholds. In alternative embodiments, the exemplary method 800 may be modified for use with any desired number of duplicate functional units. In one embodiment, for example, the method 800 may be used in an environment having two duplicate functional units, each functional unit having a different susceptibility to soft errors, and two radiation detectors. In another alternative, the method 800 may be used in an environment having four duplicate functional units, each functional unit having a different susceptibility to soft errors, and four radiation detectors.

The method 800 may begin in operation 805 with the monitoring of at least one radiation detector. In operation 810, it is determined whether a first radiation detector has generated a signal indicating that radiation in excess of a first threshold has been detected. If radiation in excess of a first threshold has been detected, then use of the first unit is suspended in operation 815. In addition, the first radiation detector may be reset in operation 815. If radiation in excess of a first threshold is not detected, then it is determined whether use of the first unit was previously suspended in operation 820. If the use of the first unit was not previously suspended, operation 830 is next performed. On the other hand, if use of the first unit was previously suspended, then the first unit may be activated in operation 825. If operation 825 is performed, operation 830 is next performed.

In operation 830, it is determined whether a second radiation detector has generated a signal indicating that radiation in excess of a second threshold has been detected. If radiation in excess of a second threshold has been detected, then use of the first and second units is suspended in operation 835. In addition, the second radiation detector may be reset in operation 835. If radiation in excess of a second threshold is not detected, then it is determined whether use of the second unit was previously suspended in operation 840. If the use of the second unit was not previously suspended, operation 850 is next performed. On the other hand, if use of the second unit was previously suspended, then the second unit may be activated in operation 845. If operation 845 is performed, operation 850 is next performed.

In operation 850, it is determined whether a third radiation detector has generated a signal indicating that radiation in excess of a third threshold has been detected. If radiation in excess of the third threshold has been detected, then use of the first, second, and third units is suspended in operation 855. In addition, the third radiation detector may be reset in operation 855 and the method 800 may be repeated. Alternatively, the operation 855 may include shutting down the system. If radiation in excess of a third threshold is not detected, then it is determined whether use of the third unit was previously suspended in operation 860. If use of the third unit was previously suspended, then the third unit may be activated in operation 865. If operation 865 is performed, the method 800 may be repeated. Similarly, if the use of the third unit was not previously suspended, the method 800 may be repeated.

The method 800 is directed to detecting radiation levels in excess of first, second, and third thresholds, wherein the first threshold is lower than the second threshold, and the second threshold is lower than the third threshold. While the method 800 performs operations in a sequence beginning with the first threshold and ending with the third threshold, in alternative embodiments, different sequences of operations may be employed. For instance, the method 800 may begin with determining whether a third radiation detector has generated a signal in one embodiment, Further, one or more of the operations performed in the method 800 may be performed simultaneously. In addition, the method 800 may be modified for use with more or fewer than three thresholds.

Figure 9:
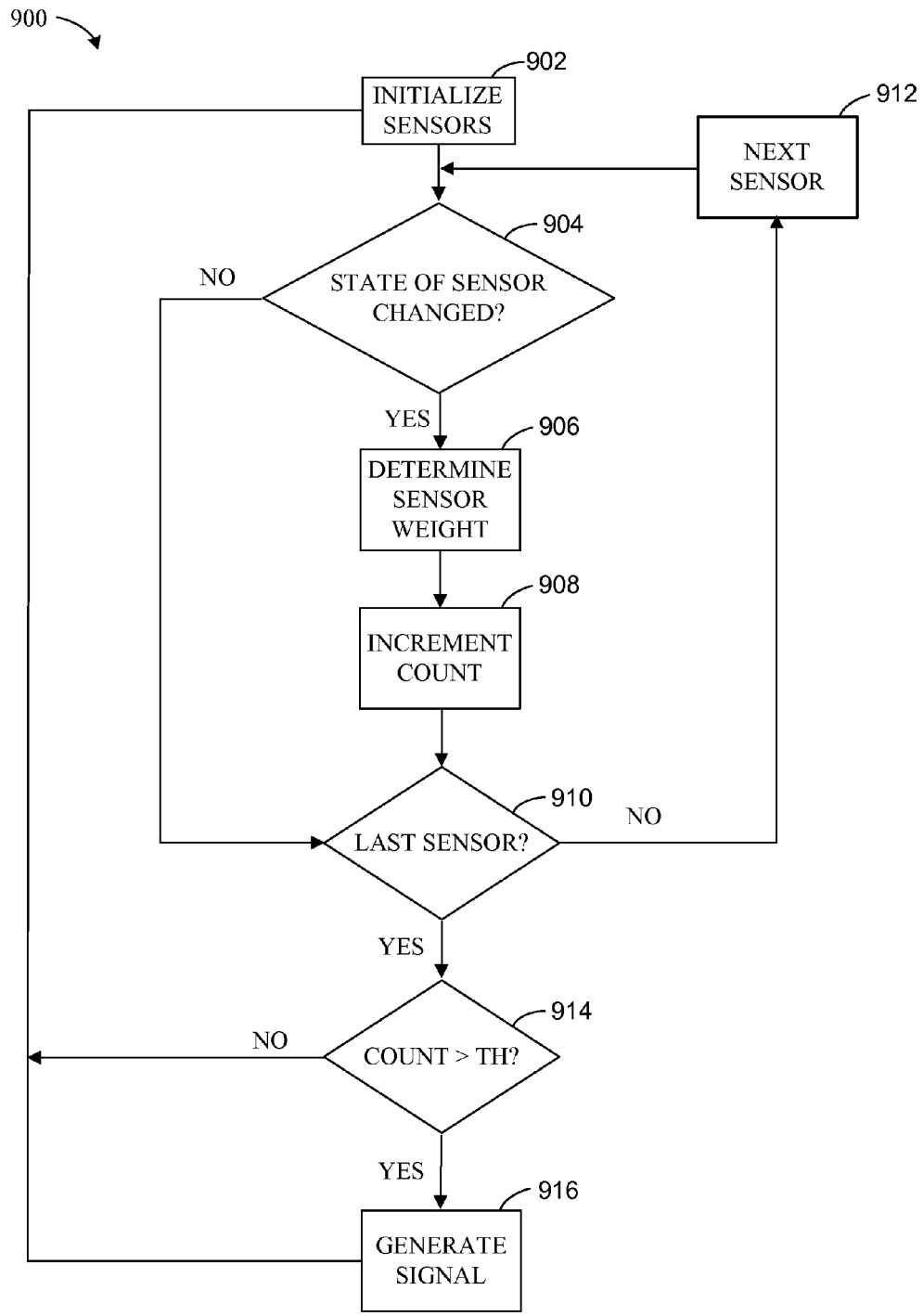
FIG. 9 illustrates an exemplary method for determining whether radiation exceeds a threshold according to one embodiment.

FIG. 9 illustrates an exemplary method 900 for determining whether radiation exceeds a threshold and generating a signal when the threshold is exceeded according to one embodiment. The method 900 may be used with a detector having two or more sensors. For example, the method 900 may be used with the detector 300, the detector 400, or the detector 500. In an alternative, the method 900 may be used with two or more sensors disposed in two of more distinct detectors. In addition, the method may be used with a detector in which every sensor has the same weight in a counting scheme that is described below. Alternatively, the method may be used with a detector in which one or more detectors may have different weights in the counting scheme.

In operation, 902, the sensors may be placed in an initial state. As described above, the sensors may be placed in an initial state in which a 1 or a 0 is stored. In operation 904, it is determined if the state of a sensor has changed. If the sensor stores the complement of its initial state it is in a signaling state. The operation 904 may include detecting a signal from a sensor that is automatically generated by the sensor when the state of the sensor changes. In one embodiment, the operation 904 may include sensing the state of a sensor and comparing it with an initial state. If the state of the sensor has not changed, it may be determined in operation 910 whether the sensor evaluated in operation 904 is the last sensor to be evaluated in the detector. (If sensors automatically generate a signal when the state of the sensor changes, operation 910 may be omitted.) If the current sensor is not the last sensor to be evaluated, the next sensor may be identified in operation 912, with process returning to operation 904 where operation 904 is repeated for the next sensor.

If the state of the sensor has changed, it may be determined in operation 906 what weight is to be given the sensor. While in some embodiments every sensor has the same weight in a counting scheme, in other embodiments particular sensors may have different weights. For example, a first sensor may have a lower critical charge than a second sensor. The first sensor may be sensitive to radiation above a first threshold and the second sensor may be sensitive to radiation above a second threshold, where the second threshold may generally correspond to a higher level of radiation than the first threshold. Accordingly, the second sensor may be assigned a greater weight than the first sensor in an embodiment. In other words, a state change in a less sensitive sensor may be given greater weight than a state change in a more sensitive sensor. Any suitable weighing scheme may be employed.

In operation 908, a count may be incremented. The operation 908 may include incrementally increasing a voltage or a current at a node that serves as an input to a counter or a device functioning as a counter. In operation 910, it may be determined whether the sensor evaluated is the last sensor to be evaluated. In operation 914, it is determined whether the count is greater than a count threshold. In one embodiment, it may be determined whether the count is greater than or equal to a count threshold. If the count exceeds the count threshold, a signal is generated. The signal may indicate that a radiation level in excess of a threshold has been detected. The signal may be used for any of the operations described herein, such as to suspend the operation of a functional unit having a sensitivity to soft errors that may correspond with the detector. On the other hand, if the count does not exceed the count threshold, the operation 902 may be next performed. That is, if the count does not exceed the count threshold, the sensors and the count may be initialized and the method repeated. Similarly, if the count exceeds the count threshold, the sensor and the count may be may be initialized and the method repeated.

While the invention has been described with reference to the specific embodiments thereof, those skilled in the art will be able to make various modifications to the described embodiments of the invention without departing from the true spirit and scope of the invention. The terms and descriptions used herein are set forth by way of illustration only and are not meant as limitations. Those skilled in the art will recognize that these and other variations are possible within the spirit and scope of the invention as defined in the following claims and there equivalents.

What is claimed is:

1. An apparatus comprising:
   a first radiation detector to generate a first signal when a first radiation level is exceeded;
   a second radiation detector to generate a second signal when a second radiation level is exceeded, the second radiation level being greater than the first radiation level;
   a first unit susceptible to soft errors at the first radiation level;
   a second unit susceptible to soft errors at the second radiation level; and a control unit coupled with the first and second radiation detectors, the control unit to suspend use of the first unit and to activate use of the second unit if the first signal is received and the second signal is not received.

2. The apparatus of claim 1, wherein the control unit suspends use of the first and second units if the second signal is received.

3. The apparatus of claim 1, wherein the first and second units are memories.

4. The apparatus of claim 1, wherein the first and second units are logic circuits.

5. The apparatus of claim 1, wherein the first radiation detector includes two or more first sensors that are susceptible to soft errors at a first radiation level, and the second radiation detector includes two or more second sensors that are susceptible to soft errors at a second radiation level.

6. The apparatus of claim 5, wherein the first radiation detector generates the first signal if one of the first sensors detects that the first radiation level is exceeded.

7. The apparatus of claim 5, wherein the first radiation detector generates the first signal if two or more of the first sensors detect that the first radiation level is exceeded.

8. The apparatus of claim 1, wherein the first radiation detector includes two or more first sensors each to change a state of the sensor if radiation is sensed, and the first radiation detector generates the first signal if a count of sensors having a change of sensor state is greater than a count threshold, wherein the count weights at least one of the first sensors more heavily than another of the first sensors.

9. A method comprising:
generating a first signal by a first radiation detector if a first radiation level is exceeded;
generating a second signal by a second radiation detector if a second radiation level is exceeded, the second radiation level being greater than the first radiation level; and
suspending use of a first circuit and activating use of a second circuit if the first signal is generated and the second signal is not generated, wherein the first circuit is susceptible to soft errors at the first radiation level, and the second circuit is susceptible to soft errors at the second radiation level.

10. The method of claim 9, further comprising suspending use of the first and second circuits if the second signal is generated.

11. The method of claim 9, wherein the first and second circuits are memories.

12. The method of claim 9, wherein the first and second circuits are logic circuits.

13. The method of claim 9, wherein the first radiation detector includes two or more first sensors that are susceptible to soft errors at a first radiation level, and the second radiation detector includes two or more second sensors that are susceptible to soft errors at a second radiation level.

14. The method of claim 13, wherein the generating the first signal includes detecting by one of the first sensors that the first radiation level is exceeded.

15. The method of claim 13, wherein the generating the first signal includes detecting by two or more of the first sensors that the first radiation level is exceeded.

16. The method of claim 9, wherein the first radiation detector includes two or more first sensors, each sensor to change a state of the sensor if radiation is sensed, and the generating of the first signal includes counting sensors having a change of sensor state, wherein the count weights at least one of the first sensors more heavily than another of the first sensors.

17. A method comprising:
generating a first signal by a first radiation detector when a radiation level in excess of a first radiation level is detected, the first radiation detector including two or more first radiation sensors and two or more second radiation sensors, the first radiation sensors changing to a signaling state if a radiation level in excess of a second radiation level is detected and the second radiation sensors changing to a signaling state if a radiation level in excess of a third radiation level is detected, the third radiation level being distinct from the second radiation level;
determining a count of first radiation sensors in a signaling state and second radiation sensors in a signaling state, wherein the second radiation sensors in the signaling state are weighted more heavily than the first radiation sensors in a signaling state in the count.

18. The method of claim 17, further comprising:
generating a second signal by a second radiation detector if a fourth radiation level is exceeded, the fourth radiation level being greater than the first radiation level; and
suspending use of a first circuit and activating use of a second circuit if the first signal is generated and the second signal is not generated, wherein the first circuit is susceptible to soft errors at the first radiation level, and the second circuit is susceptible to soft errors at the fourth radiation level.

* * * * *